US012540010B2

(12) United States Patent
Maendele et al.

(10) Patent No.: US 12,540,010 B2
(45) Date of Patent: Feb. 3, 2026

(54) ELECTRONIC DEVICE STORAGE ASSEMBLY

(71) Applicants: Mark Maendele, Edwardsville, IL (US); Jacob Sitze, Worden, IL (US)

(72) Inventors: Mark Maendele, Edwardsville, IL (US); Jacob Sitze, Worden, IL (US)

( * ) Notice: Subject to any disclaimer, the term of this patent is extended or adjusted under 35 U.S.C. 154(b) by 165 days.

(21) Appl. No.: 18/482,619

(22) Filed: Oct. 6, 2023

(65) Prior Publication Data

US 2024/0124191 A1 Apr. 18, 2024

Related U.S. Application Data

(60) Provisional application No. 63/417,240, filed on Oct. 18, 2022.

(51) Int. Cl.

| | |
|---|---|
| ***B65D 25/00*** | (2006.01) |
| ***A45C 11/00*** | (2006.01) |
| ***B65D 25/04*** | (2006.01) |
| ***B65D 25/22*** | (2006.01) |
| ***E05G 1/06*** | (2006.01) |

(52) U.S. Cl.

CPC .......... *B65D 25/005* (2013.01); *A45C 11/002* (2025.01); *B65D 25/04* (2013.01); *B65D 25/22* (2013.01); *E05G 1/06* (2013.01); *B65D 2203/00* (2013.01); *B65D 2255/00* (2013.01)

(58) Field of Classification Search

CPC ......... B65D 25/005; H02J 7/0044; E05G 1/06

See application file for complete search history.

(56) References Cited

U.S. PATENT DOCUMENTS

| | | | | | |
|---|---|---|---|---|---|
| 1,121,089 | A * | 12/1914 | Grenfell | A45C 1/12 | 232/1 D |
| 3,819,109 | A * | 6/1974 | Ucciardino | A47G 29/1201 | 232/24 |
| 4,356,956 | A * | 11/1982 | Long | A47G 29/1201 | 232/1 R |
| 4,491,269 | A * | 1/1985 | Sweazey | G07B 15/02 | 232/1 D |
| D528,072 | S * | 9/2006 | Chen | D13/108 | |
| 9,337,674 | B2 * | 5/2016 | Wang | G06F 1/1632 | |
| 10,084,327 | B2 * | 9/2018 | Roberts | H02J 7/0044 | |
| 10,355,502 | B2 * | 7/2019 | Chen | H02J 7/0013 | |
| 11,462,925 | B2 * | 10/2022 | Roberts | H02J 7/0045 | |
| 2015/0042281 | A1 * | 2/2015 | Marze | H02J 7/0036 | 320/115 |
| 2019/0027944 | A1 * | 1/2019 | Grzybowski | H02J 7/0044 | |
| 2022/0344953 | A1 * | 10/2022 | Harner | H05K 5/0221 | |

* cited by examiner

*Primary Examiner* — Mollie Impink

(74) *Attorney, Agent, or Firm* — Carroll, Hoette & Butscher LLC; Christopher R. Carroll

(57) ABSTRACT

An electronic device storage assembly includes an outer housing having sides that define an interior volume. At least a first side of the sides of the housing has openings sized for electronic devices to be inserted into the openings. The assembly also includes divider panels disposed within the outer housing and dividing the interior volume of the outer housing into smaller storage compartments. The storage compartments defined by the divider panels are aligned with the openings in the housing so that placement of the electronic devices through the openings places the electronic devices into the storage compartments. One or more of the first side or a second side of the housing is configured to open to provide access to the storage compartments and the electronic devices stored in the storage compartments.

7 Claims, 5 Drawing Sheets

ELECTRONIC DEVICE STORAGE ASSEMBLY

CROSS-REFERENCE TO RELATED APPLICATIONS

This application claims priority to U.S. Provisional Application No. 63/417,240 (filed 18 Oct. 2022), the entire disclosure of which is incorporated herein by reference.

BACKGROUND

Technical Field

The subject matter described herein relates to assemblies that can temporarily store electronic devices, such as cell phones.

Discussion of Art

With more and more electronic devices being readily available to students, more and more students may become distracted in classrooms and not actively engaged with instructors. For example, while cell phones can be used as an educational aid, often these phones are a source of entertainment and other distractions that are not conducive to a learning environment.

Yet, the instructor collecting the electronic from students at the beginning of an instruction period and then distributing the electronic devices at the end of the instruction period is less than a desirable solution. This process can consume a significant amount of the limited time that may be available for instruction. Moreover, during certain emergency situations, access to the electronic devices by students may be immediately needed (which can be prevented or difficult if a single instructor is tasked with collecting and distributing the electronic devices).

It may be desirable to have an assembly and method that differ from those that are currently available.

BRIEF DESCRIPTION

An electronic device storage assembly includes an outer housing having sides that define an interior volume. At least a first side of the sides of the housing has openings sized for electronic devices to be inserted into the openings. The assembly also includes divider panels disposed within the outer housing and dividing the interior volume of the outer housing into smaller storage compartments. The storage compartments defined by the divider panels are aligned with the openings in the housing so that placement of the electronic devices through the openings places the electronic devices into the storage compartments. One or more of the first side or a second side of the housing is configured to open to provide access to the storage compartments and the electronic devices stored in the storage compartments.

BRIEF DESCRIPTION OF THE DRAWINGS

The subject matter may be understood from reading the following description of non-limiting embodiments, with reference to the attached drawings, wherein below.

DETAILED DESCRIPTION

Embodiments of the subject matter described herein relate to electronic device storage assemblies and methods that can store electronic devices (e.g., mobile or cell phones, tablet computers, or the like) while keeping the devices separate and organized, and allowing the entire assemblies to be quickly removed in the event of an emergency situation. Keeping the devices separate and organized can speed up the distribution of the devices back to the owners or possessors, such as to students at the conclusion of a class or instruction period. Keeping the devices in the assemblies and away from the owners can increase the attention of the owners or possessors (e.g., students) during the class or instruction period.

While one or more examples are provided herein for using the assemblies and methods for storing cell phones of students during a class, not all embodiments of the inventive subject matter are limited to cell phones or students. Other electronic devices can be stored and/or the devices can belong or be possessed by other persons than students. For example, the assemblies may be used in hospitals to keep devices away from surgical suites or other areas that need to remain disinfected, sporting events or concerts where devices capable of filming or photography are not allowed, etc.

Figure 1:
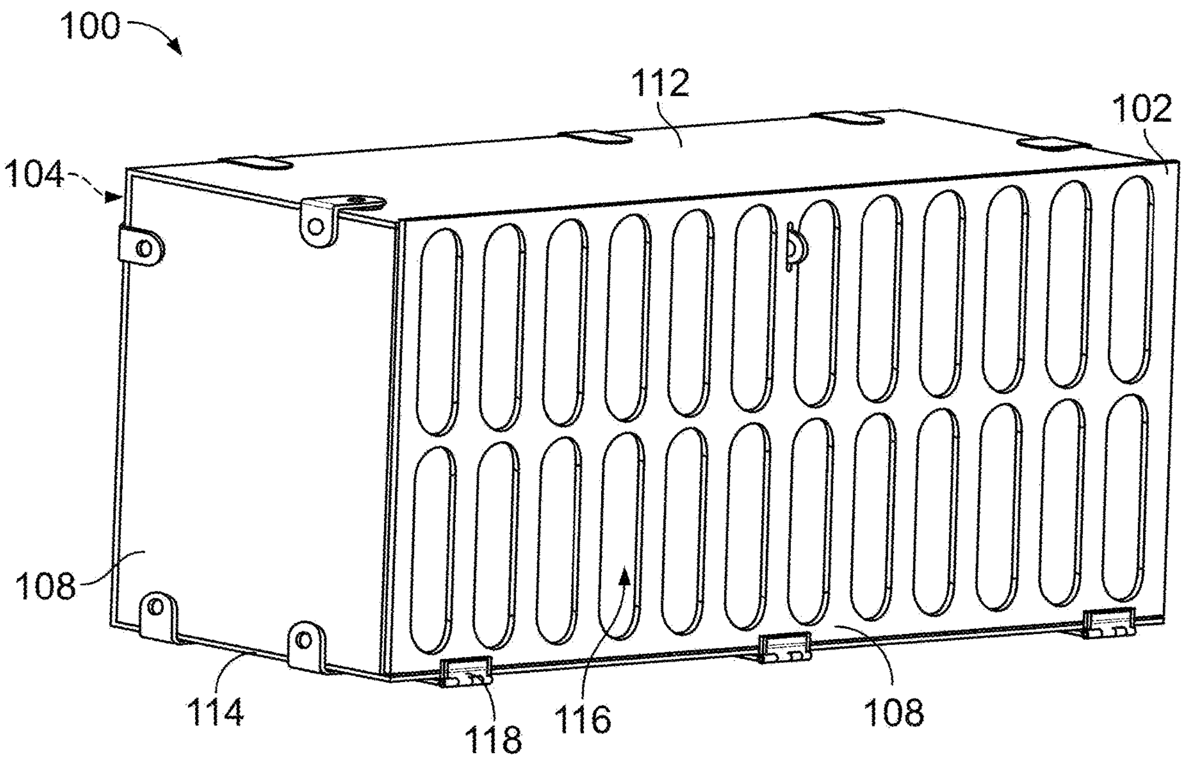
FIG. 1 illustrates a perspective view of one example of an electronic device storage assembly.
Figure 2:
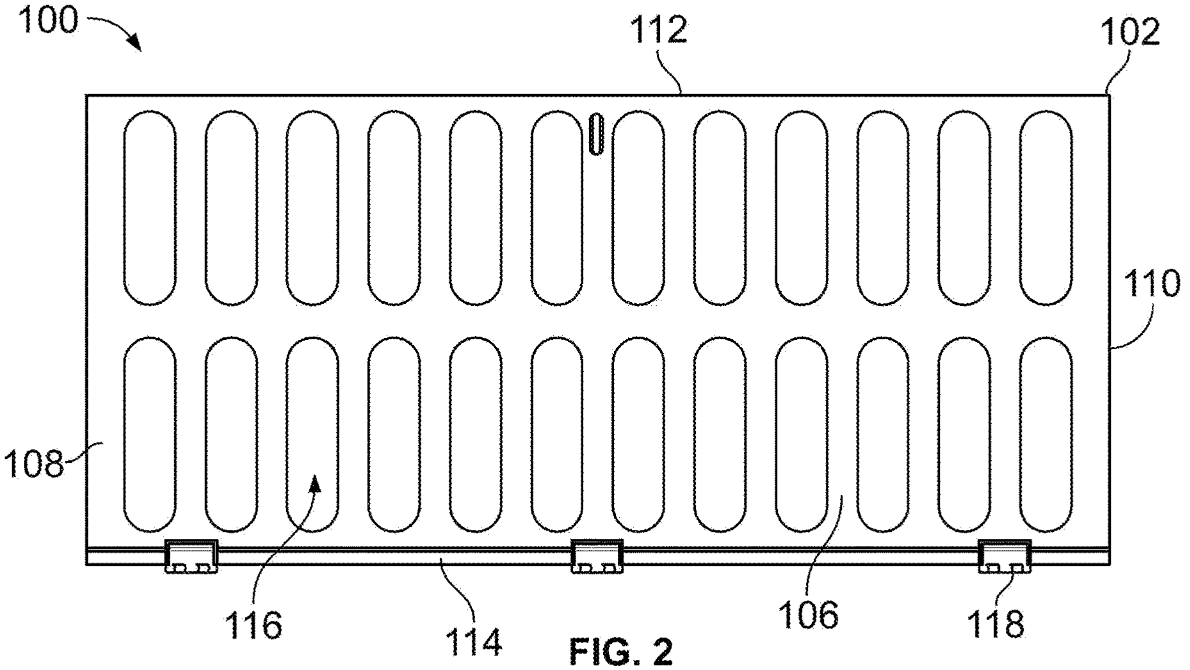
FIG. 2 is a front view of the storage assembly shown in FIG. 1 in a closed state.

FIG. 1 illustrates a perspective view of one example of an electronic device storage assembly 100. FIG. 2 is a front view of the storage assembly shown in FIG. 1 in a closed state. The assembly may have an outer housing 102 in which the electronic devices are stored. The outer housing can have the shape of a box or rectangular box, or alternatively may have another shape. The housing may include a back side 104 and an opposite front side 106, a first lateral side 108 and an opposite second lateral side 110, a top side 112 and an opposite bottom side 114. Each of the back side and the front side may interconnect and extend from the first lateral side to the second lateral side and from the top side to the bottom side. Each of the lateral sides may interconnect and extend from the front side to the back side and from the top side to the bottom side. Each of the top and bottom sides may interconnect and extend from the front side to the back side and from the first lateral side to the second lateral side.

The front side of the housing may include slots or openings 116 through which the electronic devices may be inserted. These slots or openings may be large enough to insert the electronic devices, but small enough to prevent or impede hands from reaching into the housing through the slots or openings to remove the electronic devices. For example, the slots or openings may be less than an inch wide, less than 1.5 inches wide, or the like, and the slots or openings may be less than three inches long, less than two inches long, or the like. This can provide a security feature of the assembly in which the electronic devices are small enough to fit through the slots or openings, but a hand alone or a hand grasping the electronic device inside the housing may be too large to remove the electronic device.

Figure 3:
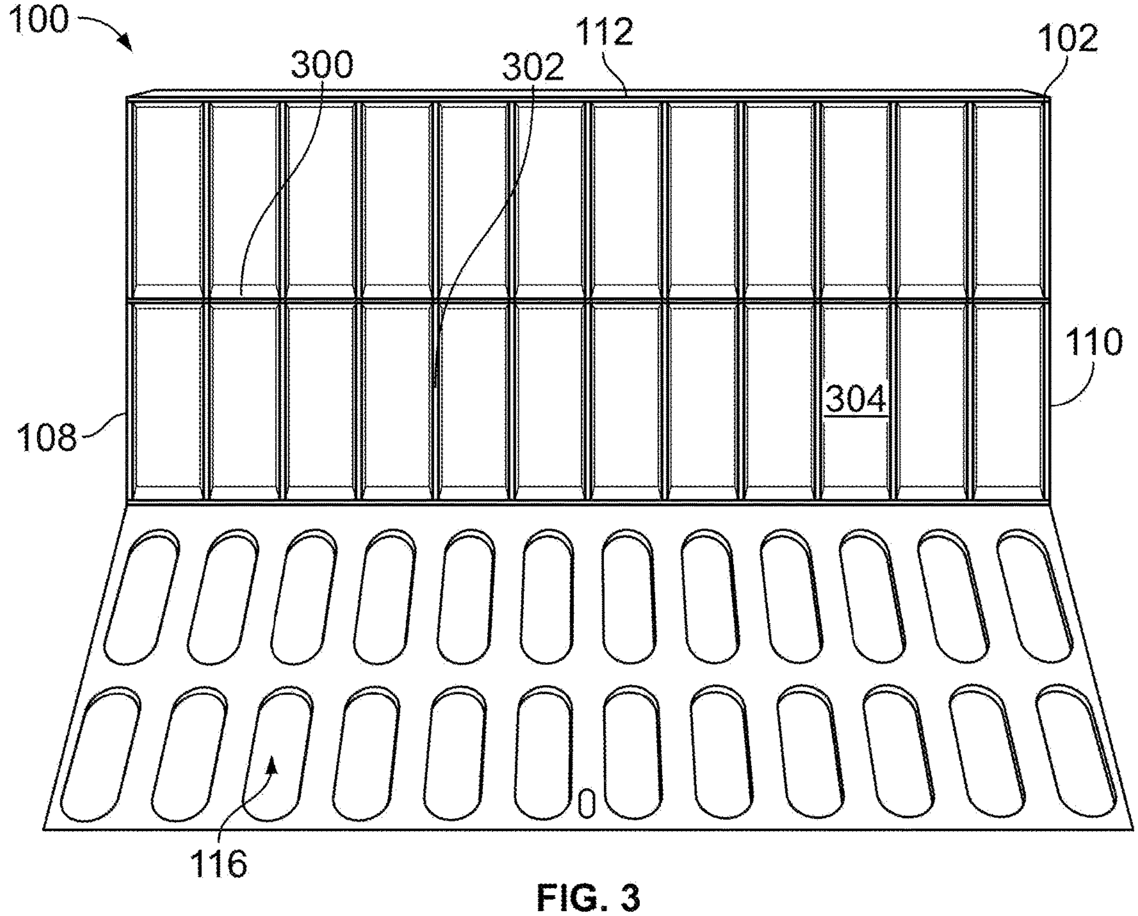
FIG. 3 illustrates another front view of the assembly in an open state.
Figure 4:
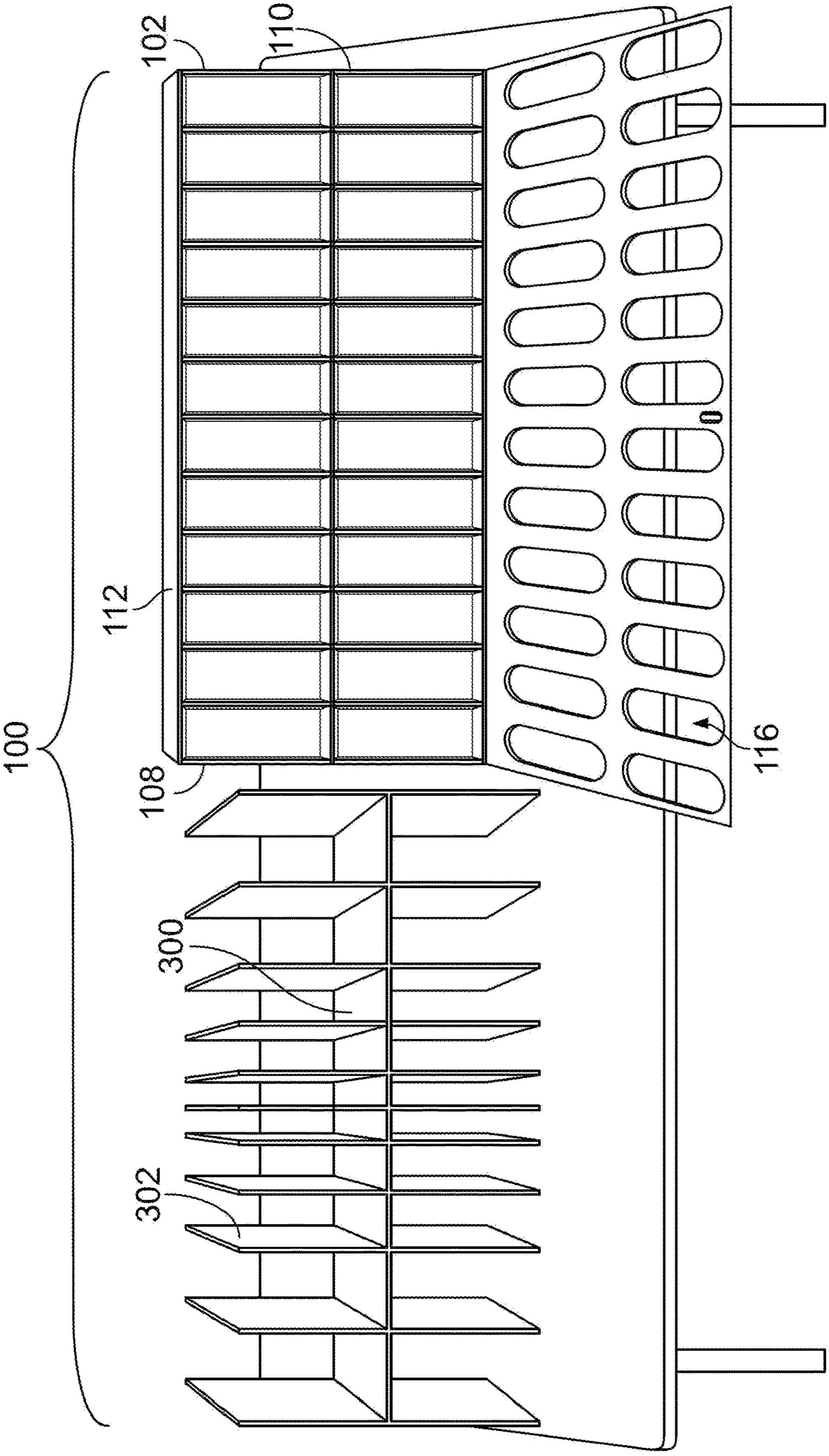
FIG. 4 illustrates the assembly in a disassembled state.

FIG. 3 illustrates another front view of the assembly in an open state. FIG. 4 illustrates the assembly in a disassembled state. As shown, the housing may include divider panels 300, 302 that divide the interior volume of or defined by the housing into smaller storage compartments 304. The divider panels include a horizontal divider panel 300 and several vertical divider panels 302. Alternatively, a greater or lesser number of the vertical divider panels may be provided and more than one horizontal divider panel may be provided. The divider panels may be removed from the interior volume of the housing in one example, as shown in FIG. 4. Alternatively, the divider panels may be fixed to the interior surfaces of the sides of the housing and not removable therefrom.

The storage compartments may be defined by the divider panels and the housing in that each storage compartment may be bounded or framed by a different portion the divider panels and different portions of one or more of the sides of the housing. The storage compartments may be aligned with the slots or openings such that each slot or opening provides access to only a single one of the storage compartments. Insertion of an electronic device into a slot or opening causes the electronic device to be housed within the storage compartment associated or aligned with the slot or opening.

As shown in FIG. 3, the front side with the slots or openings may be connected with the bottom side of the housing by hinges 118 (shown in FIGS. 1 and 2) to allow the front side to pivot relative to the bottom side of the housing. Alternatively, the front side may be completely removable from the housing, may slide into and out of slots extending in the inner surfaces of the lateral sides of the housing, may slide into and out of slots extending into the top and bottom sides of the housing, or the like.

The front side can be opened (by pivoting the front side or removing the front side) to allow access into the storage compartments. Alternatively, a side other than the side having the slots or openings may be opened to access the electronic devices. For example, the back side of the housing may be removed or removable to access the electronic devices inserted through the slots or openings in the front side of the housing.

In operation, when a class or instruction period is completed or the owners/possessors of the electronic devices are to collect their electronic devices, the front side can be opened to allow easier grasping and access to the electronic devices. The front side and/or one or more other sides of the housing can include a lock or other security device to lock the housing closed and prevent access to the electronic devices in one embodiment. Alternatively, no lock or other security device may be provided (e.g., where the assembly is placed in a room in a location that is not easily accessible to others).

Figure 7:
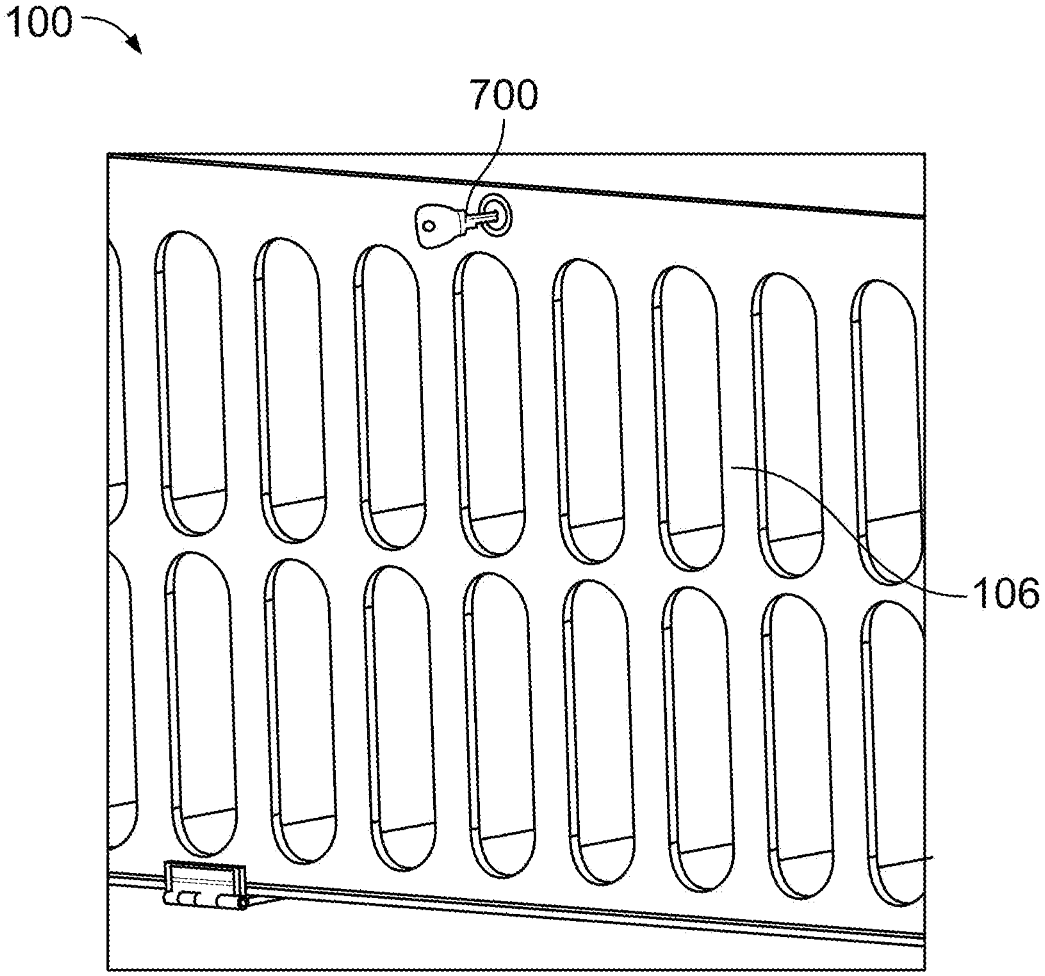
FIG. 7 illustrates one example of a lock that may be used to secure the front side of the assembly in a closed or locked state.

FIG. 7 illustrates one example of a lock 700 that may be used to secure the front side of the assembly in a closed or locked state. The lock may be a device that moves or rotates an arm inside the assembly responsive to a key being inserted into the lock. This arm may engage a ledge or other arm to lock the front side of the assembly closed. The arm may be rotated in another direction to disengage the arm from the ledge or other arm, and unlock the front side of the assembly.

Figure 5:
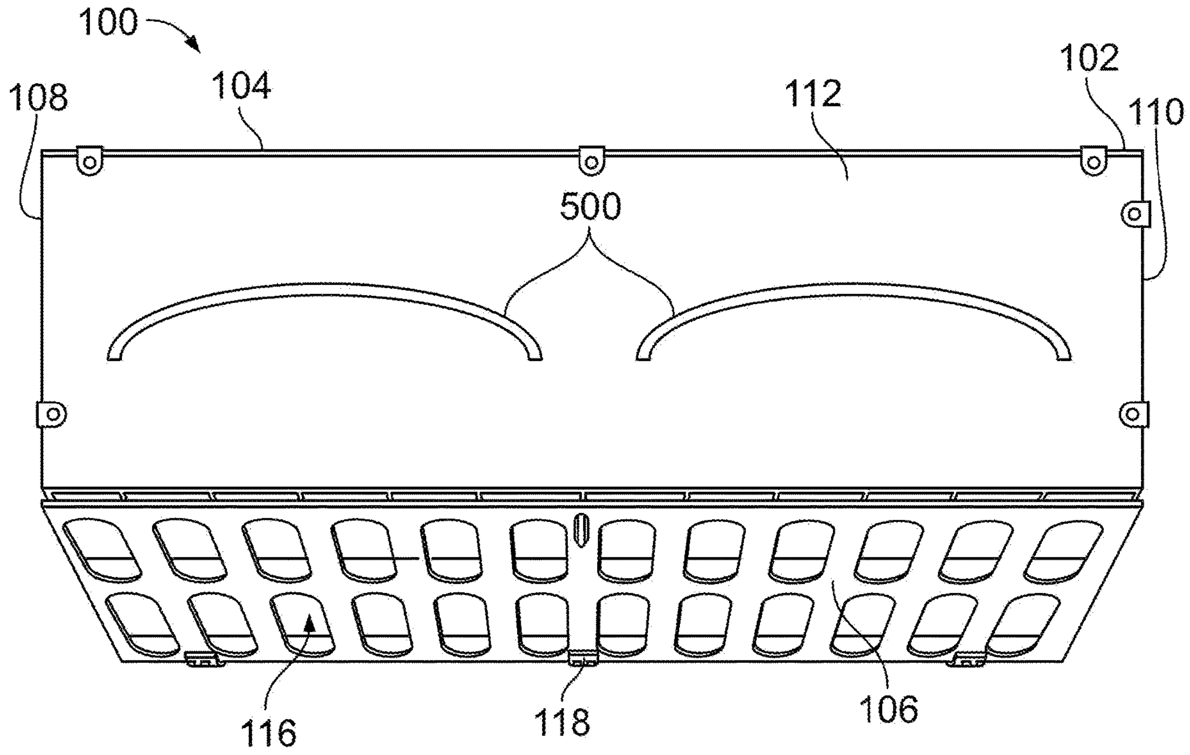
FIG. 5 illustrates a top view of one example of the assembly with grasping bodies.

FIG. 5 illustrates a top view of one example of the assembly with grasping bodies 500. The assembly optionally can include one or more grasping bodies, such as handles, attached to one or more sides (e.g., the top side) of the housing. These grasping bodies can allow for a person to easily grasp and carry the assembly. For example, in an emergency situation, a teacher, instructor, or other person can quickly and easily grasp the grasping bodies and carry the entire assembly away to a safe location for distribution of the electronic devices to the students or other persons.

The housing optionally can include one or more slots, openings, or other holes on one or more sides (e.g., the back side) that are shaped to receive projections of a wall, desk, or the like. For example, the back side of the housing may include slots, openings, or the like, that can receive screws, tabs, or other projections extending from a wall. This can secure the housing to the wall, desk, or the like. The housing may be slid away from the fasteners to remove the housing from the fasteners and carry the housing away from the wall, desk, or the like, for easy removal in an emergency or other situation.

The housing optionally can include one or more inductive charging devices in the storage compartments and connected with a power source, such as a utility grid, solar panel, battery, or the like. Upon placement of the electronic devices into the slots or openings in the front side of the housing, the electronic devices may be inductively charged by the charging devices while the electronic devices are in the storage compartments. For example, one or more of the walls or surfaces that extend around and define a storage compartment may represent an inductive charging device that can wirelessly charge the electronic device located within that storage compartment. The inductive charging devices may be connected via one or more wires or cables to a power source, such as a utility grid, a solar panel, a battery, or the like.

The housing optionally can include one or more disinfecting devices in the storage compartments. These devices can include ultraviolet (UV) light sources, or the like. Upon placement of the electronic devices into the slots or openings in the front side of the housing, the disinfecting devices may disinfect bacteria, viruses, or other microorganisms present on the electronic devices in the storage compartments.

Figure 6:
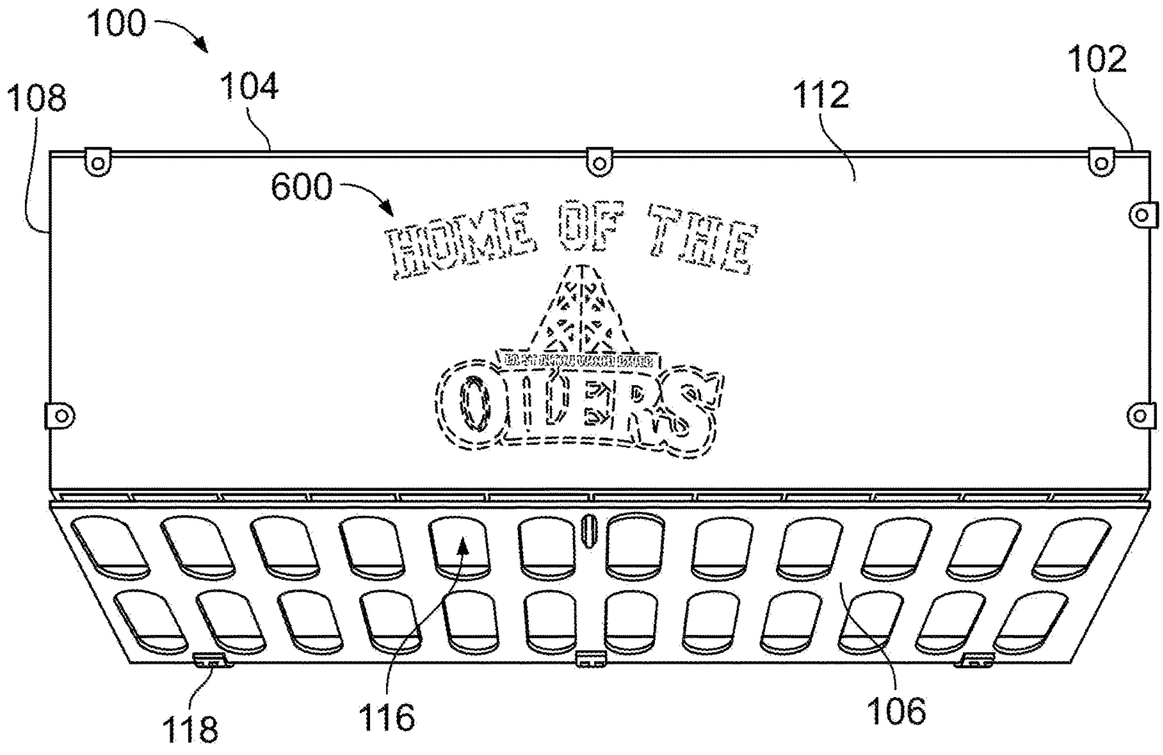
FIG. 6 illustrates another example of the assembly with customizable indicia.

FIG. 6 illustrates another example of the assembly. One or more sides of the housing may be customized with indicia 600, such as a pattern, logo, or the like. For example, the name of the school in which the assembly is used, the name of the teacher or instructor using the assembly, the name or number of the classroom where the assembly is used, etc., may be printed or otherwise placed onto one or more sides of the housing.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments “comprising,” “comprises,” “including,” “includes,” “having,” or “has” an element or a plurality of elements having a particular property may include additional such elements not having that property. In the appended claims, the terms “including” and “in which” are used as the plain-English equivalents of the respective terms “comprising” and “wherein.” Moreover, in the following claims, the terms “first,” “second,” and “third,” etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An electronic device storage assembly comprising:

an outer housing having a front side, a back side opposite to the front side, a first lateral side, a second lateral side opposite to the first lateral side, a top side, and a bottom side that define an interior volume, the front side having openings sized for electronic devices to be inserted into the interior volume through the openings yet impede hands from reaching into the housing to remove the electronic devices, the back side including slots configured to receive fasteners coupled with a wall to mount the outer housing to the wall, the outer housing is configured to be lifted to remove the fasteners from the slots in the back side to remove the outer housing from the wall, the top side including one or more handles for carrying the outer housing and for lifting the outer housing for removal from the wall; and divider panels disposed within the interior volume, each of the divider panels being positioned between two adjacent ones of the openings in the front side to define a plurality of storage compartments, each of the storage compartments being aligned with one of the openings to allow each of the electronic devices to be placed into a separate one of the storage compartments, wherein the front side of the outer housing is pivotally connected to one of the top side, the bottom side, the first lateral side, or the second lateral side to allow the front side to pivot such that the interior volume can be accessed in order to access all of the electronic devices stored in the interior volume.

2. The assembly of claim 1, wherein the openings in the outer housing are sized to receive mobile phones or tablet computers but also sized to prevent a human hand from reaching into and removing the mobile phones or the tablet computers through the openings.

3. The assembly of claim 1, wherein the slots in the back side of the outer housing are first elongated slots, and the openings in the outer housing are second elongated slots.

4. The assembly of claim 1, wherein the front side of the outer housing is configured to pivot about hinges coupled with the bottom side of the outer housing to open the outer housing and provide simultaneous access to all the storage compartments.

5. The assembly of claim 1, wherein the top side of the outer housing is perpendicular to the first lateral side, the second lateral side, the back side, and the front side.

6. The assembly of claim 1, wherein one or more of the front side, the back side, the first lateral side, the second lateral side, the top side, or the bottom side of the outer housing includes customized indicia.

7. The assembly of claim 1, further comprising a lock to secure the front side closed and prevent access to the storage compartments and the electronic devices.

* * * * *